United States Patent [19]

Hodgson et al.

[11] 4,433,983

[45] Feb. 28, 1984

[54] CALCIUM CHLORIDE DEHYDRATION NOZZLE

[75] Inventors: Robert A. Hodgson; Sam J. Martinez, both of Tulsa, Okla.

[73] Assignee: Maloney-Crawford Corporation, Tulsa, Okla.

[21] Appl. No.: 398,231

[22] Filed: Jul. 14, 1982

Related U.S. Application Data

[63] Continuation of Ser. No. 194,410, Oct. 6, 1980, abandoned.

[51] Int. Cl.³ .............................................. B01D 53/28
[52] U.S. Cl. ........................................ 55/171; 55/221; 55/281; 55/388; 261/114 R
[58] Field of Search ................. 55/29, 30, 89, 93, 220, 55/221, 280, 281, 316, 388, 171; 261/110, 114 R

[56] References Cited

U.S. PATENT DOCUMENTS

| | | | |
|---|---|---|---|
| 852,543 | 5/1907 | Deckebach | 55/388 X |
| 870,546 | 11/1907 | Cooke | 55/388 X |
| 906,975 | 12/1908 | Wessels | 261/114 R |
| 1,789,059 | 1/1931 | Tifft et al. | 261/114 R |
| 2,052,532 | 8/1936 | Parsons | 261/114 R |
| 2,394,679 | 2/1946 | Gerhold | 261/114 R |
| 2,786,082 | 3/1957 | Klockman | 261/114 R |
| 2,804,935 | 9/1957 | Hutchinson | 55/221 |
| 2,804,940 | 9/1957 | Hutchinson | 55/30 |
| 2,804,941 | 9/1957 | Hutchinson | 55/93 X |
| 2,916,103 | 12/1959 | Daugherty | 55/221 |
| 2,995,203 | 8/1961 | Maurer | 55/29 |
| 3,170,776 | 2/1965 | Knight et al. | 55/221 |
| 3,246,454 | 4/1966 | Norton | 55/388 X |
| 3,254,497 | 6/1966 | Henry et al. | 55/221 X |
| 3,545,177 | 12/1970 | Hodgson | 55/30 |
| 3,729,179 | 4/1973 | Keller | 261/114 R |

*Primary Examiner*—Robert H. Spitzer
*Attorney, Agent, or Firm*—Head, Johnson & Stevenson

[57] ABSTRACT

An apparatus for separating liquid and associated liquid vapor from a gas stream by contacting liquid brine in concurrent flow through and across a plurality of stages and direct contact with a bed of calcium chloride within an upper portion of the apparatus to remove a final portion of liquid from the gas stream. The improvement being in the tapered bed of desiccant material and the stage configuration. Each of the stages has an upper tray and a lower tray connected thereto with a central conduit connected to the upper tray enabling liquid brine to traverse from the upper to the lower tray. A plurality of mixing housings extend from above the liquid level in the lower tray to slightly above the upper tray and each has a base housing coaxial therewith and of a larger diameter which extends from the lower tray to slightly below a lower end of the corresponding mixing housing. Each of the mixing housings has a conduit member coaxial with and of a smaller diameter than the mixing housing which extends partially into the corresponding mixing housing and into the base housing, wherein gas flowing through the mixing housings will aspirate brine in concurrent flow from the lower tray.

5 Claims, 6 Drawing Figures

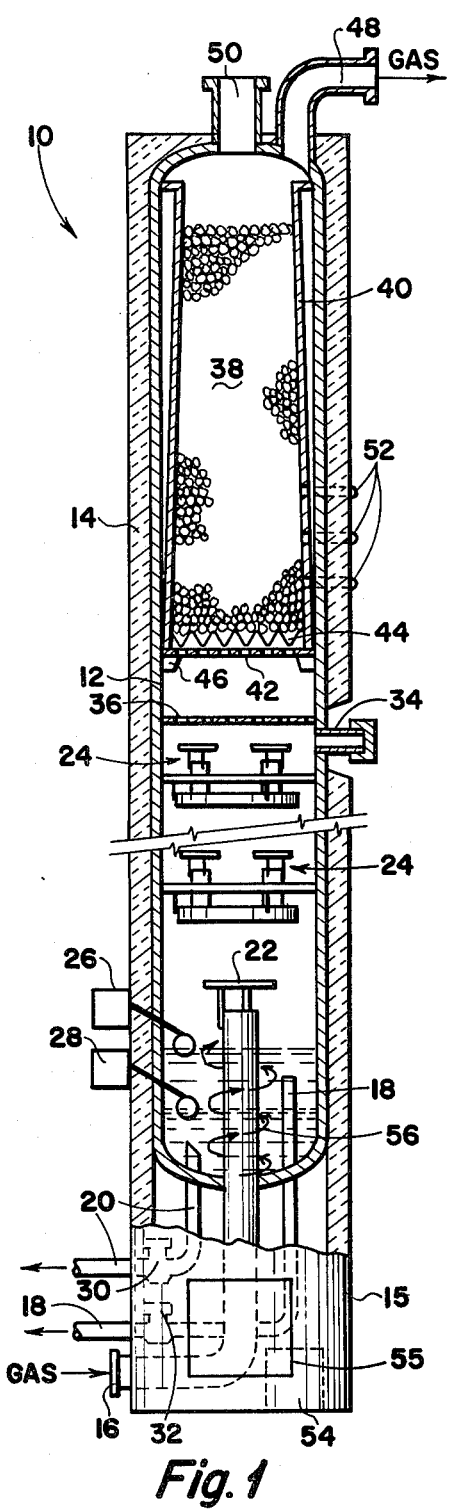
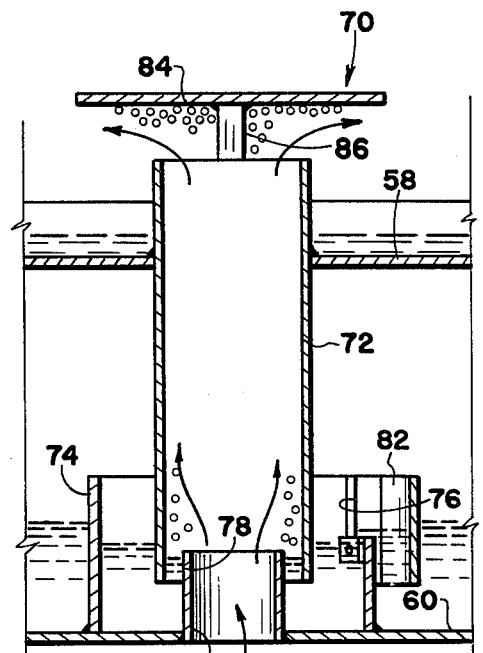
Fig. 4
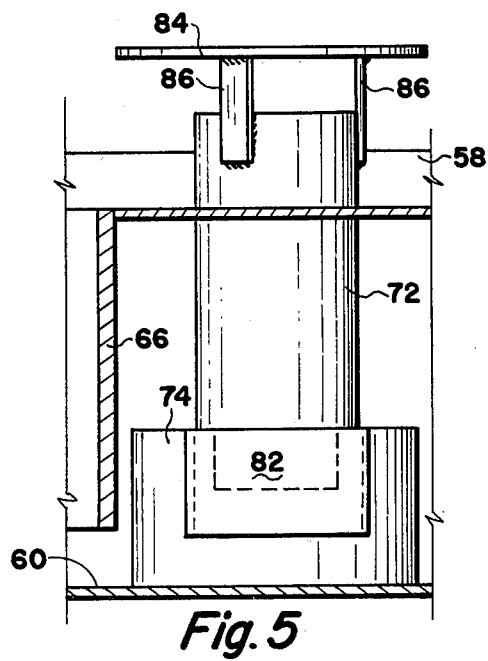
Fig. 5
Fig. 1

CALCIUM CHLORIDE DEHYDRATION NOZZLE

This is a continuation application of Ser. No. 194,410, filed Oct. 6, 1980 and now abandoned.

BACKGROUND OF THE INVENTION

1. Field of the Invention

The present invention relates to an apparatus for separating liquid and associated liquid vapor from a gas stream and, more particularly, to such an apparatus utilizing calcium chloride as a desiccant.

2. Description of the Prior Art

Natural gas is a mixture of hydrocarbon gases along with various impurities including water vapor and heavier hydrocarbons. When raw natural gas is withdrawn from the underground reservoirs, the impurities are considered objectionable and are usually removed by various processing methods. Water vapor in natural gas is a very serious problem in gas production because it can cause corrosion and reduce pipeline capacity or block gas flow by condensation or through the formation of hydrates. Many different processes have been invented to remove this objectionable impurity content from gas streams with the most prevailant being glycol reheating processes. These glycol processes are very efficient however they have economical and safety drawbacks. More stringent safety and pollution requirements have prevented the use of glycol dehydration units in certain applications due to the requirement of the direct fired reboiler needed for the operation of the process. Further, within a remote location it would be uneconomical to locate a glycol dehydration unit due to the need for a fuel supply and other associated requirements.

In recent years there has been an increased interest in utilizing non reboiler type processes, such as calcium chloride brine dehydrators. Dehydration of a gas stream utilizing brine formed from the gas stream contacting a bed of calcium chloride has been taught hereintofore and specifically within my invention covered by U.S. Pat. No. 3,545,177. Due to the environmental requirements and the ever increasing need for more efficient production of energy, there is a need for new and improved designs of calcium chloride dehydration units which have increased gas-brine contacting as well as improved bed design to avoid bridging and channeling of the material.

SUMMARY OF THE INVENTION

It is a primary object of the present invention to provide a gas dehydration unit of an improved design to increase the gas-brine contact for increased dehydration efficiency.

Another object of the present invention is to provide a gas dehydration unit with improved nozzle design to prevent any siphoning or excessive heading from deteriorating the efficiency of the process.

Another object of the present invention is to provide a gas dehydration unit with adjustable weirs for different sized nozzles and specific gravity of brine to increase the efficiency of the process.

Another object of the present invention is to provide a tapered calcium chloride bed to avoid bridging and channeling thereof.

Other and further objects of the present invention will be made apparent through the reading of the detailed description of the preferred embodiments and the viewing of the drawings.

The present invention is generally comprised of a substantially vertical housing with lower, intermediate and upper portions. Liquid laden gas is introduced into the lower portion of the housing and flows upwards through a pipe contacting a horizontal baffle aiding in the initial separation of any liquid vapor from the gas stream. The gas stream flows across and through a plurality of horizontal stages within the intermediate portion of the housing wherein the gas contacts desiccant brine in concurrent flow removing a major portion of the contained liquid. The gas then flows upwards through a desiccant bed of calcium chloride which removes water vapor to the designed level and produces brine for the contacting stages below. The bed of calcium chloride is contained within tapered confinement to prevent channeling or bridging problems. The now substantially dehydrated gas flows out of the upper portion of the housing for use elsewhere. Water and other liquid impurities, as well as any excess brine, are removed through dump valves in communication with level controls in the lower portion of the housing. Each stage is comprised of an upper tray extending across the interior cross-section of the housing and a lower tray connected thereto of a diameter less than the interior of the housing. A central conduit is connected to a lower portion of the upper tray enabling liquid brine to traverse from the upper to the lower tray. The lower tray is provided with a weir to maintain a constant liquid level therein. A plurality of mixing housings extend from above the liquid level in the lower tray to slightly above the upper tray and each mixing housing has a corresponding base housing of a larger diameter coaxial therewith. Each base housing extends from the lower tray to slightly below a lower end of the corresponding mixing housing. An adjustable metering weir is provided within each of the base housings to admit liquid brine into the base housing as well as to maintain a constant brine level therein. A short conduit coaxial with and of a smaller diameter than the mixing housings extends partially into each of the corresponding mixing housings and down into the base housings wherein gas flowing through the mixing housings will aspirate brine in concurrent flow from the lower tray. The new stage design provides increased efficiency with improved liquid-gas contact with the elimination of siphoning and other problems associated with prior art stage designs.

BRIEF DESCRIPTION OF THE DRAWINGS

FIG. 1 is a sectional view of a gas dehydrator embodying the present invention;

FIG. 4 is a view taken along line 4—4 of FIG. 3;

FIG. 5 is a view taken along line 5—5 of FIG. 3; and

DETAILED DESCRIPTION OF THE PREFERRED EMBODIMENTS

Figure 2:
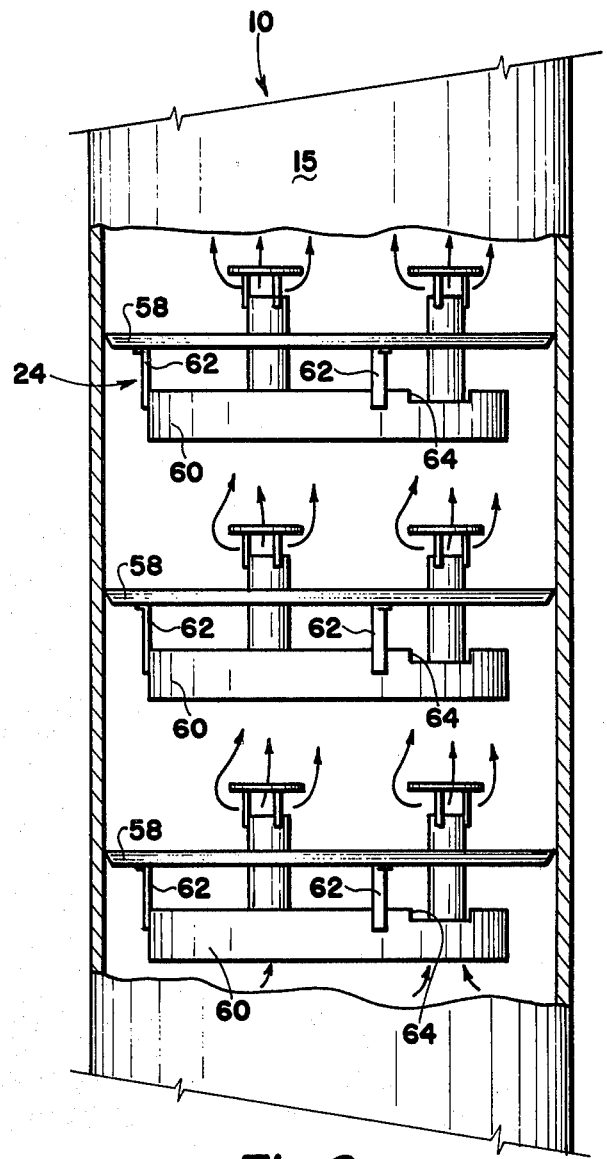
FIG. 2 is a partial sectional view of a plurality of tray stages within the gas dehydrator.

Referring to the drawings in detail, reference character 10 generally indicates a gas dehydrator apparatus utilizing a non-regenerated desiccant solution. As shown in FIG. 1, the gas dehydrator 10 has a vertically disposed cylindrical housing or casing 12 surrounded by a layer of insulative material 14 and a skirt or skin 15. The lower portion of the casing 12 is provided with typical fluid control means including a moisture laden gas inlet conduit 16, an oil or distillate outlet conduit 18 and a water or brine outlet conduit 20. The interior end of the gas inlet conduit 16 is provided with a horizontally disposed gas diverter or baffle 22 as a primary water knockout means prior to the gas passing through a plurality of horizontally disposed tray stages 24 found immediately upward thereof. Suitable float control devices 26 and 28 in communication with dump valves 30 and 32 on the conduits 18 and 20 respectively control the level of oil or distillate and water or brine within the lower portion of the casing 12. A plurality of tray access openings 34 in the casing 12 may be provided at each tray position in the event it is necessary to modify flow characteristics of each tray as may be necessary and to ensure proper operation of each tray relative to the contact of wet gas with a concurrent flow of brine therethrough, as will be described in more detail below.

Spaced immediately above the uppermost tray stage 24 is a horizontal gas distributor plate 36 having a plurality of holes therethrough for horizontally spreading the flow of gas. A bed of desiccant material 38, such as pelletized calcium chloride or any other suitable desiccant, is contained within a tapered inner casing 40 in the upper portion of the casing 12 which extends from a small diameter at the uppermost portion to a larger diameter at the lowermost portion. The casing 40 is tapered to prevent any bridging or channeling in the material 38 as it dissolves. The desiccant material 38 is supported on a lower horizontal support plate 42 having a plurality of holes therethrough and a pleated screen 44 to keep the material 38 from plugging the holes in the plate 42. The support plate 42 rests upon an annular rim 46 extending from the casing 12 or any other suitable means.

A gas outlet conduit 48 extends out from the interior of the casing 12 and is connected to a gas pipeline or other means to distribute the dry gas for use elsewhere. A refill opening 50 is provided in the uppermost portion of the casing 12 to provide access into the interior thereof for the resupply of the expendable desiccant material 38. In order to determine the desiccant bed level a plurality of bull's-eye type sight gauges 52 are installed at the lower portion of the bed section to provide an indication of the bed level and thereby assist the operator in determining when the bed should be replenished. The sight gauges 52 are removable to allow for periodic cleaning.

In the event that the gas dehydrator apparatus 10 is to be located in regions where freeze protection is necessary a catalytic space heater 54 may be provided within the lower portion of the apparatus 10 beneath the casing 12 and may be enclosed within an insulated housing to direct heat to the dump valves 30 and 32. The heater 54 and the valves 30 and 32 are accessible through a door 55 through the skirt 15. An alternate freeze protection system consists of a space heater installed in the bottom of the apparatus 10 beneath the casing 12 with suitable insulation, venting and access and a dehydrator feed gas connection extending through an internal helical heating coil 56 immersed in the brine at the bottom of the vessel casing 12 to permit the heat in the feed gas to maintain the brine above its freezing temperature and to facilitate melting if it freezes during a shut-down.

The process of dehydration of a gas within the apparatus 10 is as follows: The moisture laden inlet gas stream enters the interior of the casing 12 through the conduit 16 where free water and liquid hydrocarbon carried over from the production separator are knocked out by the baffle 22 and flow to storage within the bottom of the vessel 12 and to eventual disposal through the conduits 18 and 20. The gas then flows upwards through the plurality of tray stages 24 where the gas contacts calcium chloride brine flowing downward. The brine is produced from gas flowing through the desiccant bed 38 above, and removes most of the water vapor from the gas as the brine flows downward. Upon leaving the tray stages 24, the gas flows through the pelletized calcium chloride bed 38 which removes water vapor to the design level, and produces the brine for the trays 24 below. The gas then is removed through the outlet 48 for use elsewhere.

Figure 3:
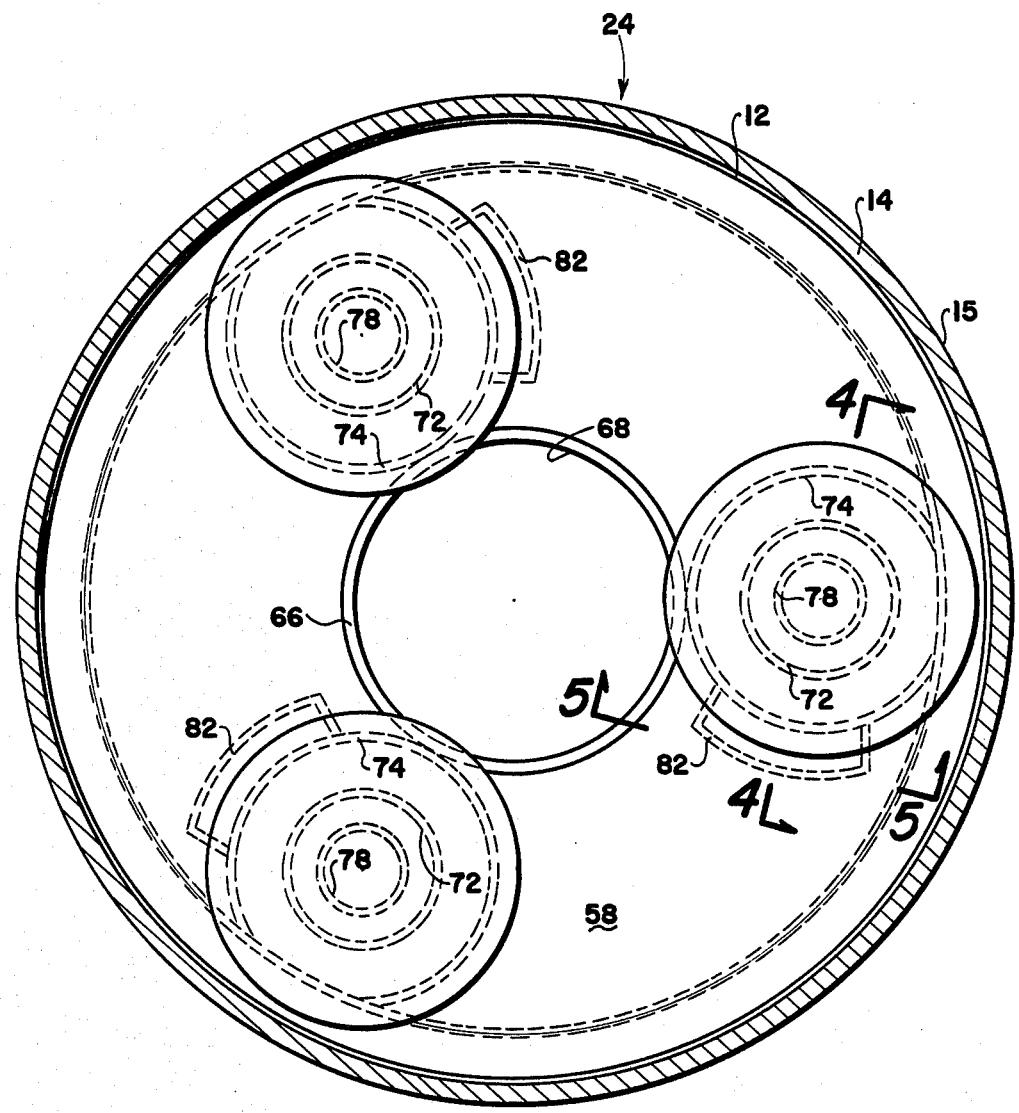
FIG. 3 is a top plan view of a tray stage having a plurality of nozzles.

Besides the novel configuration of the desiccant casing 40, the major improvement of the present invention is the design of gas nozzles. Two designs of nozzles will be described below and it should be understood that these designs and other distinctive features of the present invention may be utilized in other dehydrators and specifically within a waste brine dehydrator described in U.S. Pat. No. 3,545,177 to Hodgson which is incorporated herein by reference. As shown in FIG. 2, the tray stages 24 are comprised of an upper or sealing tray 58 horizontally extending across the interior of the casing 12 and having a lower tray 60 of a smaller diameter extending therebelow by means of brackets 62. Each lower tray 60 is provided with an overflow weir 64 from which overflow brine falls into the next lower stage 24 or into the bottom of the casing 12. As shown in FIG. 3, the upper tray 58 is provided with a downward extending central downcomer conduit 66 with a central opening 68. The upper tray 58 is designed to collect all the brine overflowing as from the next upward adjacent tray section 24 while the lower tray 60 collects a portion of the brine through the downcomer conduit 66. One embodiment of nozzle design is shown in FIGS. 4 and 5. Each tray stage 24 has a plurality of nozzles generally indicated by reference numeral 70 and are radially spaced around the conduit 66. Each nozzle 70 is provided with a vertical mixing housing or conduit 72 which extends from above the upper tray 58 to below the liquid level of the lower tray 60. A weir base housing 74 extends coaxial with the mixing housing 72 upward from the lower tray 60 to encompass a lower end of the mixing housing 72. The base housing 74 is provided with a metering weir 76 for determining the level of brine contained therein. Each of the weirs 76 may be provided with sliding bars with set screws or any other suitable means to provide weir height adjustment in order to "tune" or adjust the flow characteristics of the nozzles 70 for optimum dehydration efficiency. The adjustment means may be accessed through the holes 34. A nozzle tube 78 extends from an opening 80 in the lower tray 60 coaxial with the base housing 74 upwards a partial distance into the lower portion of the mixing housing 72. A rectangular baffle means 82 is attached to an exterior portion of the base housing 74 surrounding the metering weir 76 in order to provide an even flow of brine through and over the weirs 76. Connected to a top portion of each of the mixing housings 72 is a horizontal divertor or baffle 84 connected by a plurality of posts 86.

In operation, a major portion of the dehydration takes place within the tray section 24. Gas flowing at a high velocity passes through each of the nozzle tubes 78, picks up brine in the form of mist and small droplets. This brine has the ability to absorb water vapor from the gas stream. These droplets are carried upward where they are intimately comingled with the turbulent gas in the mixing housings 72. The heavier brine particles separate from the gas at the outlet in the mixing housings 72, and are also deflected downward by the baffles 84 to the upper collecting tray 58. The brine then flows by gravity to the lower tray 60 through the downcomer conduit 66 where the brine is again picked up by the gas and recirculated. Excess brine which accumulates in the lower trays 60 spills over the weirs 64 to the trays 58 below. The gas then continues to the next tray stage 24 above with the final dehydration occuring within the bed of desiccant material 38. The diverters 84 may be adjustable, through the openings 34, to achieve a desired flow relationship, and in some instances a threaded cap may be used to inhibit all flow across one or more of the nozzles 70.

Figure 6:
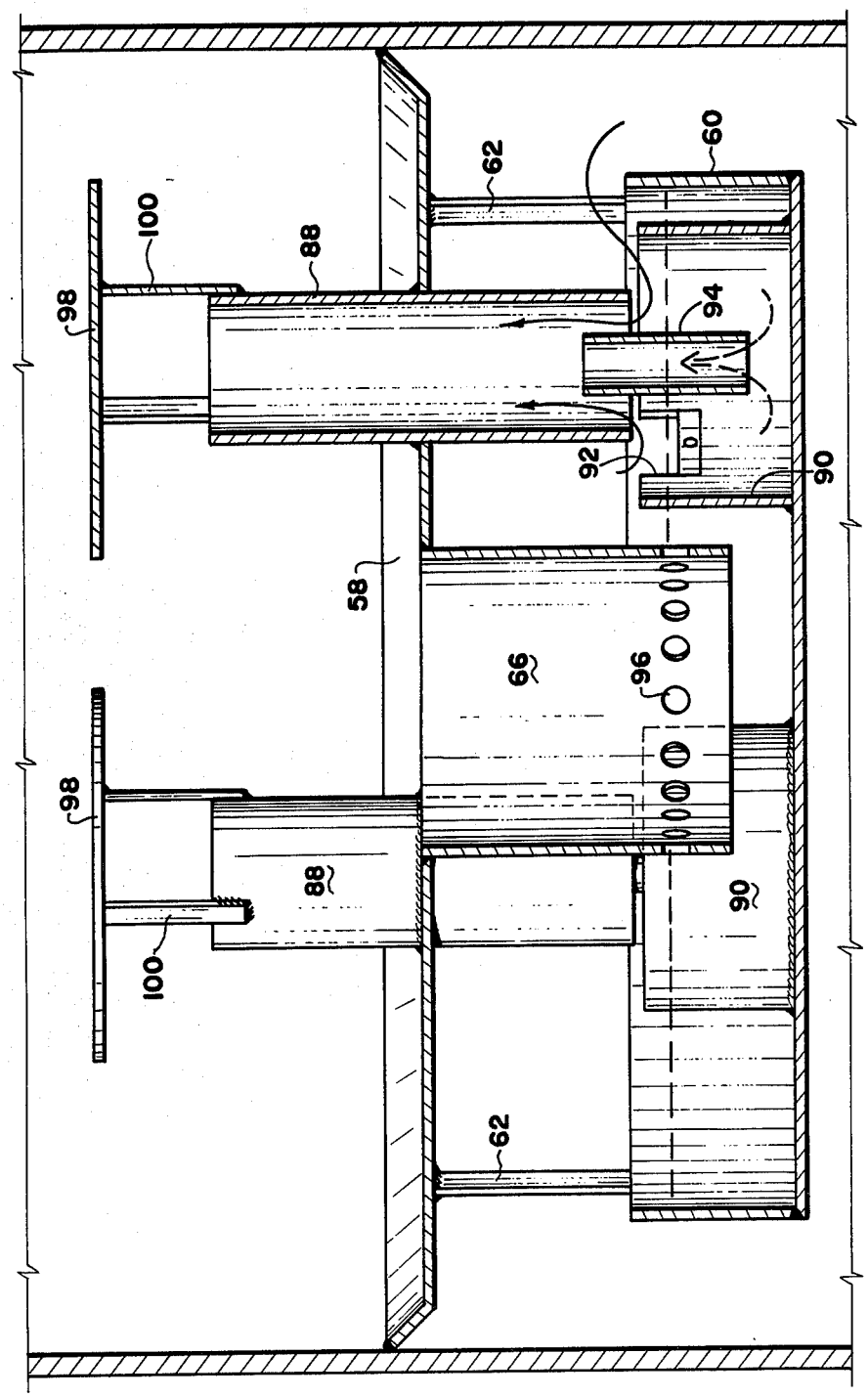
FIG. 6 is a side sectional view of an alternate tray and nozzle design.

An alternate embodiment of nozzle design is illustrated in FIG. 6 and is comprised of a mixing housing 88 extending through the upper tray 58 and downward to approximately the edge or lip level of the lower tray 60. A base housing 90 coaxial with the mixing housing 88 is attached to the lower tray 60 and extends upwards to slightly below the lower edge of the mixing housing 88. The base housing 90 is provided with a metering weir 92 and serves the same function as the weir 76 as described above. A brine restricting tube 94 is coaxially suspended by any suitable manner within the mixing housing 88 and extends into and below the liquid level of the base housing 90. The downcomer conduit 60 is provided with a plurality of circumferentially spaced holes 96 just below the fluid level of the lower tray 60 to provide circulation after the brine precipitation has taken place. Gas flows around the lower trays 60 and across the brine contained within the base housings 90 and up through the mixing housings 88. The gas flow creates a low pressure area between the mixing housing 88 and the tube 94 aspirating brine through the tube 94. This embodiment of nozzle design has increased dehydration performance by increasing the liquid-gas contact area. Also, this design eliminates any possibility of the brine siphoning out of a mixing housing at a lower flow limit. Each of the mixing housings 88 are provided with a horizontal baffle 98 attached thereto by posts 100 and are adjustable as described above concerning diverters 84.

Whereas the invention has been described in particular relation to the drawings attached hereto, it should be understood that other and further modifications of the invention, apart from those shown or suggested herein, may be made within the scope and spirit of this invention.

What is claimed is:

1. An apparatus for separating liquid and associated liquid vapor from a gas stream which is supplied variably at relatively low or high flow rates, comprising a housing with lower, intermediate and upper portions, means to introduce said liquid laden gas into said lower portion, means to withdraw substantially dry gas from said upper portion, means to supply a down flowing liquid dessicant, means to withdraw said dessicant and any fluid separated from said gas from the lower portion of said housing, the intermediate portion comprising:
    an upper tray across the interior cross-section of said housing and a lower tray connected thereto in parallel with said upper tray and of a diameter less than the interior of said housing;
    means connected to said upper tray enabling liquid dessicant to traverse from said upper to said lower tray;
    means in said lower tray to maintain a first liquid level therein;
    at least one mixing housing extending from above said first liquid level in said lower tray to slightly above said upper tray including a diverting means connected to an upper portion of said mixing housing to intersect and divert gas and brine as an aid in the separation of liquid from said gas;
    a base housing coaxial with and of a larger diameter than said mixing housing, said base housing extending from said lower tray to slightly below a lower end of said mixing housing;
    means to meter said liquid from said first liquid level into said base housing;
    a conduit means coaxial with and of a smaller diameter than said mixing housing, one end of said conduit means extending at least partially into said mixing housing, the other end positioned above the bottom of said lower tray.

2. Apparatus according to claim 1 wherein said means to meter said liquid is a weir formed as a part of said base housing.

3. An apparatus as in claim 1 wherein said liquid dessicant is formed from a body of brine forming dessicant material positioned across the cross-section of said housing within said upper portion, said body of material being in a single bed, surrounded by side walls which extend in a conical confinement upwardly-inwardly within said upper portion.

4. An apparatus as in claim 3 wherein a pleated screen is provided between said brine forming material and a support plate therebelow.

5. An apparatus as in claim 1 wherein said means connected to said upper tray enabling liquid dessicant to traverse said upper tray to said lower tray is a conduit provided with a plurality of circumferential horizontally aligned holes which are spaced partially above said first liquid level of said lower tray.

* * * * *